United States Patent
Hashimoto et al.

(10) Patent No.: US 11,130,302 B2
(45) Date of Patent: Sep. 28, 2021

(54) BEAD CORE COATING METHOD AND BEAD CORE COATING APPARATUS

(71) Applicant: TOYO TIRE & RUBBER CO., LTD., Itami (JP)

(72) Inventors: Yoshiki Hashimoto, Itami (JP); Ryoshi Miyamoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 229 days.

(21) Appl. No.: 16/134,500

(22) Filed: Sep. 18, 2018

(65) Prior Publication Data

US 2019/0084260 A1 Mar. 21, 2019

(30) Foreign Application Priority Data

Sep. 19, 2017 (JP) .............................. JP2017-178603

(51) Int. Cl.
*B29D 30/50* (2006.01)
*B29D 30/48* (2006.01)

(52) U.S. Cl.
CPC ............. *B29D 30/50* (2013.01); *B29D 30/48* (2013.01); *B29D 2030/482* (2013.01)

(58) Field of Classification Search
CPC ........ B29D 30/18; B29D 30/32; B29D 30/34; B29D 30/48; B29D 30/50; B29D 2030/3221; B29D 2030/3257; B29D 2030/3271; B29D 2030/482; B29D 2030/485; B29D 2030/487
USPC .............................. 156/130.7, 136, 422, 460
See application file for complete search history.

(56) References Cited

U.S. PATENT DOCUMENTS

| 2,605,195 | A | * | 7/1952 | Boughton | .............. | B29D 30/32 |
| | | | | | | 156/132 |
| 2013/0186556 | A1 | * | 7/2013 | Soubrier | ................ | B29D 30/50 |
| | | | | | | 156/185 |
| 2015/0343692 | A1 | | 12/2015 | Monnereau | | |

FOREIGN PATENT DOCUMENTS

| CN | 104870161 A | 8/2015 |
| CN | 105881949 A | 8/2016 |
| JP | 49-15778 A | 2/1974 |

(Continued)

OTHER PUBLICATIONS

Office Action dated May 25, 2020, issued in counterpart CN Application No. 201811086943.5, with English translation (24 pages).

*Primary Examiner* — Robert C Dye
*Assistant Examiner* — Sedef E Paquette
(74) *Attorney, Agent, or Firm* — Westerman, Hattori, Daniels & Adrian, LLP

(57) ABSTRACT

A bead core coating method for coating an annular bead core with a belt-shaped rubber sheet including the steps of: winding the rubber sheet extruded on an outer circumferential surface of a rotary drum; sticking a part of the rubber sheet to an outer surface of the bead core which is in rotation; and winding a remaining part of the rubber sheet stuck on the outer surface of the bead core while sequentially sticking the remaining part along the outer surface of the bead core, wherein air is blown to a sheet portion including the end that is not stuck to the outer surface of the bead core in the currently-winding rubber sheet in a first direction toward the end along a sheet surface or a second direction inclined toward an outer surface side of the bead core as compared with the first direction.

7 Claims, 9 Drawing Sheets

(56) References Cited

FOREIGN PATENT DOCUMENTS

JP        2012-240334 A    12/2012

\* cited by examiner

US 11,130,302 B2

BEAD CORE COATING METHOD AND BEAD CORE COATING APPARATUS

BACKGROUND OF THE INVENTION

Field of the Invention

The present invention relates to a bead core coating method and a bead core coating apparatus for coating an annular bead core with a belt-shaped rubber sheet.

Description of the Related Art

An annular bead core formed by coating a steel-wire bundle with rubber is typically disposed in a bead portion of a pneumatic tire. The surface of the bead core may be coated with a thin rubber sheet to integrate steel wires and the like. The rubber sheet is sometimes called cover rubber or bead cover rubber.

Patent Document 1 describes a bead core coating apparatus and a bead core coating method for coating the surface of the bead core with a sheet member made of rubber. The bead core coating apparatus of Patent Document 1 includes: a supply unit that supplies a belt-shaped sheet member that covers the surface of the rotating bead core; a forming roller that rotates along a rotation direction of the bead core, surrounds the sheet member supplied from the supply unit in the width direction, and sticks a part of the sheet member to the bead core while forming the part along a sectional shape of the bead core; and a crimping roller that is provided on a downstream side in a rotation direction of the bead core with respect to the forming roller, contacts with the sheet member stuck to the surface of the bead core, and rotates in a direction of an end of the sheet member from a contact position.

A bobbin around which the sheet member previously molded into a long, thin belt shape having a predetermined width is wound so as to be laminated is disposed in the supply unit that supplies the sheet member. A step of previously winding the sheet member around the bobbin is required in a method for supplying the sheet member stocked in the bobbin to the bead core. It is also necessary to dispose a film between the sheet members such that the sheet members laminated on the bobbin are not bonded to each other, which increases cost. Further, in the case that the sheet member is stuck to the bead core, a step of peeling off the film is required, which increases work man-hour. In the case that the film is peeled off, tension is applied to the sheet member to generate a size change.

Patent Document 2 describes a method and an apparatus for winding cover rubber around the bead core. The apparatus of Patent Document 2 includes a let-off device that supplies the cover rubber, a festooner to which the cover rubber supplied from the let-off device is fed, and a bead covering device that coats the bead core with the cover rubber. The festooner absorbs a speed difference of the cover rubber between the let-off device and the bead covering device. However, the use of the festooner applies the tension to the cover rubber, and the size change is generated to degrade accuracy.

In the case that the sheet member is wound from an inner circumferential surface side to an outer circumferential surface side along the sectional shape of the bead core as in Patent Document 1, because a circumferential length of the outer circumferential surface of the bead core is longer than a circumferential length of the inner circumferential surface, a tensile rate of the sheet member increases toward the outer circumferential surface side, and the sheet member is warped during the winding, which causes a wrinkle.

On the other hand, in the case that the cover rubber is wound from the outer circumferential surface side to the inner circumferential surface side along the sectional shape of the bead core as in Patent Document 2, because the circumferential length of the inner circumferential surface of the bead core is shorter than the circumferential length of the outer circumferential surface, the cover rubber remains on the inner circumferential surface side, and the wrinkle may be generated.

PRIOR ART DOCUMENT

Patent Document

Patent Document 1: JP-A-2012-240334
Patent Document 2: JP-A-49-15778

SUMMARY OF THE INVENTION

An object of the present invention is to provide a bead core coating method and a bead core coating apparatus capable of accurately coating the bead core with a belt-shaped rubber sheet while suppressing the cost and the work man-hours.

The above object can be achieved by the present invention as described below.

More specifically, a bead core coating method according to the present invention is a bead core coating method for coating an annular bead core with a belt-shaped rubber sheet, the bead core coating method including the steps of:

winding the rubber sheet extruded through a mouthpiece by an extruder on an outer circumferential surface of a rotary drum from a leading end of the rubber sheet;

sticking, from the leading end, a part in a width direction of the rubber sheet existing on the outer circumferential surface of the rotary drum to an outer surface of the bead core which is in rotation, before the rubber sheet is wound around an entire circumference of the outer circumferential surface of the rotary drum; and winding a remaining part in the width direction of the rubber sheet stuck on the outer surface of the bead core while sequentially sticking the remaining part in the width direction along the outer surface of the bead core from the part in the width direction toward an end in the width direction, wherein in the step of winding the rubber sheet around the outer surface of the bead core, air is blown to a sheet portion including the end that is not stuck to the outer surface of the bead core in the currently-winding rubber sheet in a first direction toward the end along a sheet surface or a second direction inclined toward an outer surface side of the bead core as compared with the first direction.

According to the bead core coating method having this configuration, the belt-shaped rubber sheet extruded by an extruder is wound around the outer circumferential surface of rotary drum from the leading end, the part in the width direction of the rubber sheet wound around the outer circumferential surface of the rotary drum is stuck to the outer surface of the bead core from the leading end, and the remaining part in the width direction of the rubber sheet is wound around the outer surface of the bead core. That is, the rubber sheet extruded from the extruder is directly stuck to the outer surface of the bead core through the rotary drum. According to this configuration, the stock of the bobbin used in the method of Patent Document 1 is unnecessary, and the cost and the work man-hour can be suppressed.

In the conventional method, the accuracy of the cover rubber is degraded due to the size change caused by the tension during the winding around the bobbin, the tension during the peeling of the film, the tension during conveyance using the festooner, and shrinkage at a conveyance line. On the other hand, in the present invention, the rubber sheet extruded from the extruder is stuck to the outer surface of the bead core after wound around the outer circumferential surface of the rotary drum, so that the size change can be prevented to accurately coat the bead core with the rubber sheet. The rubber sheet is wound around the bead core immediately after extruded from the extruder, so that an adhesive failure to the bead core can be improved without being affected by a decrease in tack due to a change with time.

In the step of winding the rubber sheet around the outer surface of the bead core, the currently-winding rubber sheet is held to prevent the warp by blowing the air to the sheet portion that is not stuck to the outer surface of the bead core in the currently-winding rubber sheet, so that the bead core can accurately be coated with the rubber sheet.

In the bead core coating method according to the present invention, the rotary drum may be disposed on an inner circumferential side of the bead core, and a central portion in the width direction of the rubber sheet is stuck to an inner circumferential surface of the bead core which is in rotation.

In the case that the central portion in the width direction of the rubber sheet is stuck to the inner circumferential surface of the rotating bead core while the rotary drum is disposed on the inner circumferential side of the bead core, the rubber sheet is wound around the outer surface of the bead core from the inner circumferential surface side to the outer circumferential surface side, so that the rubber sheet tends to be warped during the winding. According to the present invention, the warp can be prevented by holding the currently-winding rubber sheet.

In the bead core coating method according to the present invention, in the step of winding the rubber sheet around the outer surface of the bead core, after a sheet portion including one end in the width direction of the rubber sheet is wound, a sheet portion including the other end is wound, and air may be blown to the sheet portion including the other end.

In the step of winding the rubber sheet around the outer surface of the bead core, the warp tends to be generated at the sheet portion wound later. According to the present invention, the warp can be prevented by holding the currently-winding rubber sheet.

In the bead core coating method according to the present invention, air having a temperature higher than an ambient temperature of the rubber sheet may be blown to the sheet portion including the end.

Shrinkage due to a temperature decrease of the rubber sheet causes the warp of the rubber sheet. The temperature decrease is prevented to suppress the shrinkage of the rubber sheet by blowing air having temperature higher than an ambient temperature of the rubber sheet, so that the warp of the rubber sheet can be prevented.

The above object can be achieved by the present invention as described below.

More specifically, a bead core coating apparatus according to the present invention is a bead core coating apparatus that coats an annular bead core with a belt-shaped rubber sheet, the bead core coating apparatus including:

an extruder that extrudes the rubber sheet;

a rotary drum that winds the rubber sheet extruded from the extruder;

a covering device that supports the bead core such that an outer circumferential surface of the rotary drum and an outer surface of the bead core come closer to each other at a position on a downstream side in a rotation direction of the rotary drum with respect to the extruder, the covering device rotating the supported bead core;

an air injection mechanism that blows air to surroundings of the bead core rotated by the covering device; and a controller that controls the extruder, the rotary drum, the covering device, and the air injection mechanism, wherein the controller winds the rubber sheet extruded from the extruder from a leading end of the rubber sheet around the outer circumferential surface of the rotary drum, sticks, from the leading end, a part in a width direction of the rubber sheet existing on the outer circumferential surface of the rotary drum to the outer surface of the bead core which is in rotation, before the rubber sheet is wound around an entire circumference of the outer circumferential surface of the rotary drum, winds a remaining part in the width direction of the rubber sheet stuck on the outer surface of the bead core while sequentially sticking the remaining part in the width direction along the outer surface of the bead core from the part in the width direction toward an end in the width direction using the covering device, and the controller causes the air injection mechanism to blow air to a sheet portion including the end that is not stuck to the outer surface of the bead core in a currently-winding rubber sheet in a first direction toward the end along a sheet surface or a second direction inclined toward an outer surface side of the bead core as compared with the first direction.

The effects of the bead core coating apparatus having the configuration are described above, and the bead core can accurately be coated with the belt-shaped rubber sheet while the cost and the work man-hours are suppressed.

DETAILED DESCRIPTION OF THE PREFERRED EMBODIMENTS

Hereinafter, embodiments of the present invention will be described with reference to the drawings. In a bead core coating method and a bead core coating apparatus of the present invention, an annular bead core is coated with a belt-shaped rubber sheet. Although the bead core of the present embodiment is described as the bead core having a hexagonal shape in section, the sectional shape of the bead core that can be coated by the bead core coating method and the bead core coating apparatus of the present invention is not limited to the hexagon, but the sectional shape of the bead core may be a square or a circular shape.

Figure 1:
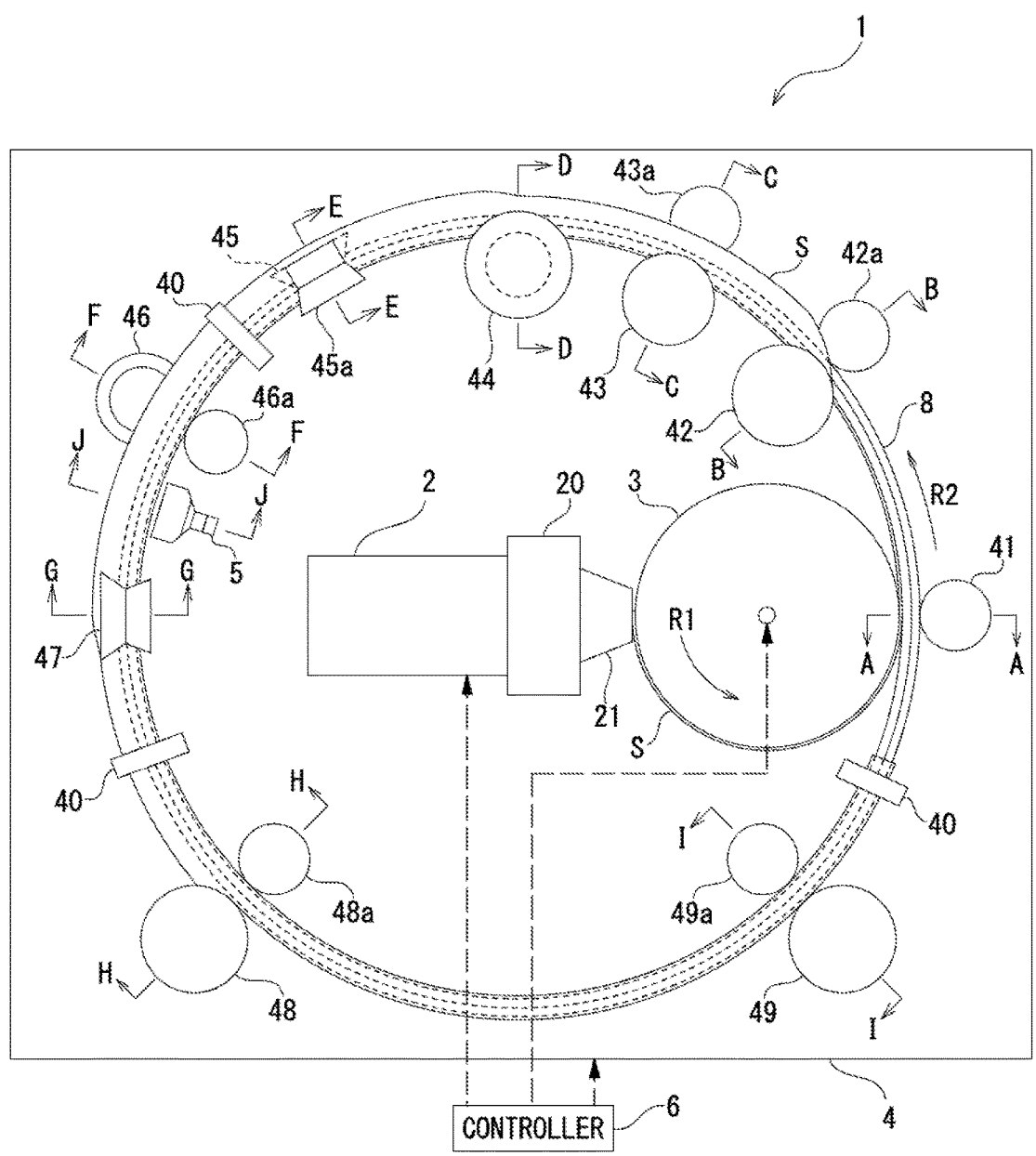
FIG. 1 is a schematic diagram illustrating an example of a configuration of a bead core coating apparatus.

FIG. 1 is a schematic diagram illustrating an example of a configuration of a bead core coating apparatus 1. The bead core coating apparatus 1 includes an extruder 2, a rotary drum 3, a covering device 4, an air injection mechanism 5, and a controller 6 that controls the extruder 2, the rotary drum 3, the covering device 4, and the air injection mechanism 5.

Figure 2:
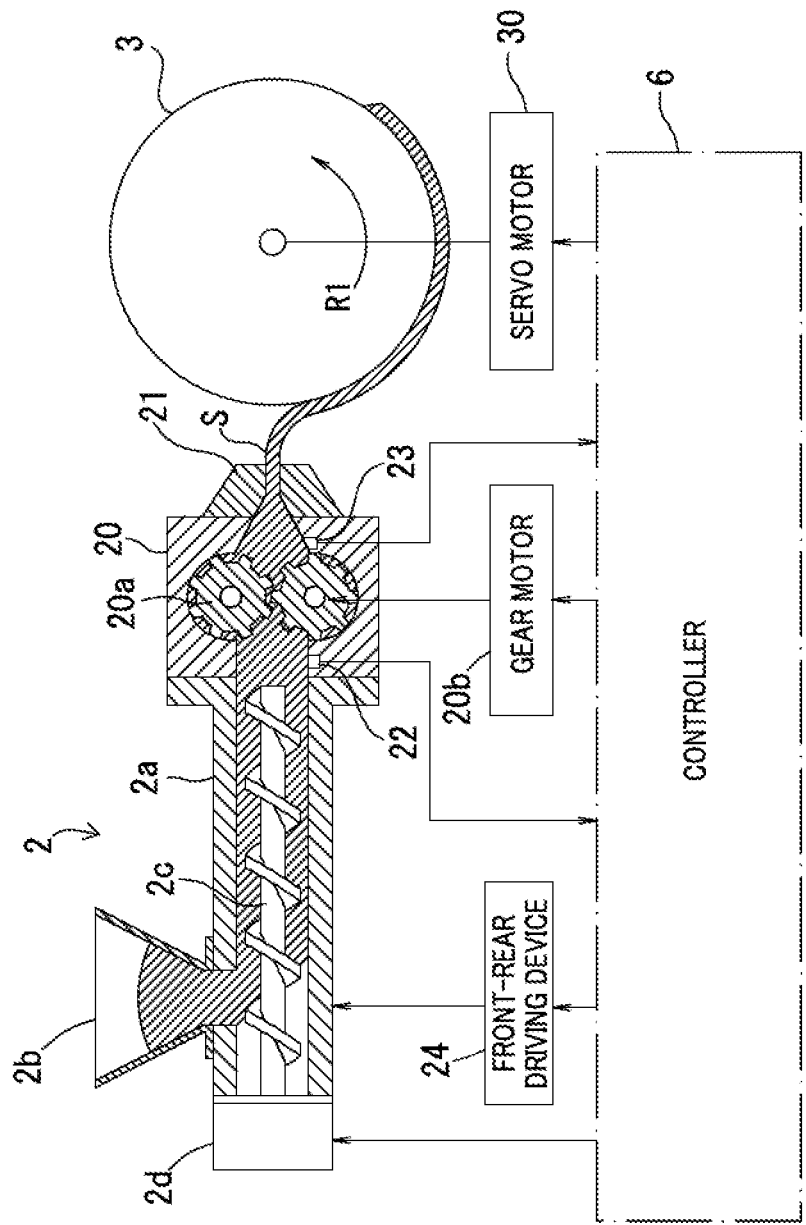
FIG. 2 is a schematic diagram illustrating an example of configurations of an extruder and a rotary drum.

FIG. 2 is a schematic diagram illustrating an example of configurations of the extruder 2 and the rotary drum 3. The extruder 2 has a cylindrical barrel 2a, a hopper 2b connected to a supply port of the barrel 2a, a screw 2c that kneads rubber and sends the rubber to a leading end side, and a screw motor 2d that rotates the screw 2c. As described later, the controller 6 controls a rotation speed of the screw motor 2d.

A gear pump 20 is connected to the leading end side in an extrusion direction of the extruder 2, and the leading end side of the gear pump 20 is connected to a mouthpiece 21. A rubber material kneaded by the extruder 2 is supplied to the gear pump 20, and the gear pump 20 supplies a fixed amount of rubber to the mouthpiece 21. From the mouthpiece 21, a rubber sheet S is extruded with a predetermined extrusion amount.

The gear pump 20 includes a pair of gears 20a, and has a function of sending the rubber to an outlet side toward the mouthpiece 21. The pair of gears 20a is rotationally driven by a gear motor 20b, and the rotation speeds of the gears 20a are controlled by the controller 6. The rotation speed of the gear motor 20b and the rotation speed of the screw motor 2d are linked with each other under the control of the controller 6, which allows the control of the extrusion amount of the rubber sheet S extruded from the mouthpiece 21. For convenience, the pair of gears 20a is vertically arranged in FIG. 2. However, the pair of gears 20a may actually be arranged in a planar direction (a direction in which a rotation axis of the gear 20a becomes vertical in FIG. 2).

A first pressure sensor 22 is provided on an inlet side of the gear pump 20, namely, on a side close to the extruder 2, and detects pressure of the rubber supplied from the extruder 2. A second pressure sensor 23 is provided on the outlet side of the gear pump 20 to detect pressure of the rubber sheet S extruded from the mouthpiece 21.

The pressure on the inlet side of the gear pump 20 is determined by the amount of rubber feed by the gear 20a of the gear pump 20 and the screw 2c of the extruder 2. When the pressure on the inlet side is kept constant, the gear pump 20 can supply a fixed amount of rubber to the mouthpiece 21, and the amount of the rubber extruded from the mouthpiece 21 is stabilized. However, when the pressure on the inlet side is unstable, the amount of rubber extruded from the mouthpiece 21 varies, and the rubber sheet S having a desired size is hardly molded.

A method for performing proportional-integral differential (PID) control on the rotation speed of the gear 20a of the gear pump 20 and the rotation speed of the screw 2c of the extruder 2 is known as a method for controlling the pressure on the inlet side of the gear pump 20. The PID control is typically used in extruding the rubber continuously and quantitatively.

The controller 6 controls the rotation speed of the screw motor 2d of the extruder 2 based on the pressure on the inlet side of the gear pump 20 detected by the first pressure sensor 22. The controller 6 controls the rotation speed of the gear motor 20b based on a predetermined control program (of a time coefficient).

In the present embodiment, what is called an external gear pump in which the gear pump 20 is connected to the leading end side in the extrusion direction of the extruder 2 is used by way of example. Alternatively, a gear pump built-in type extruder in which the gear pump is incorporated may be used. In the present invention, the extrusion amount of the gear pump built-in type extruder can more easily be controlled as compared with the extruder to which the external gear pump is connected, and necessity of the gear motor is eliminated, so that preferably the leading end of the extruder becomes compact.

The extruder 2, the gear pump 20, and the mouthpiece 21 are movable together back and forth in the extrusion direction by a front-rear driving device 24, and can move closer to or away from the rotary drum 3. The backward and forward movement is also controlled by the controller 6.

The rotary drum 3 is rotatable in a direction R1 by a servo motor 30. The rotation speed of the servo motor 30 is controlled by the controller 6. The rubber sheet S extruded through the mouthpiece 21 is supplied to the outer circumferential surface of the rotary drum 3, and the rotary drum 3 is rotated in the direction R1 while the rubber sheet S is stuck to the outer circumferential surface of the rotary drum 3, which allows the rubber sheet S to be wound along a circumferential direction. The outer circumferential surface of the rotary drum 3 is made of metal. For example, an outer diameter of the rotary drum 3 of the present embodiment ranges from 200 mm to 400 mm.

The rotary drum 3 preferably includes a cooling mechanism that cools an outer circumferential surface or a heating mechanism that heats the outer circumferential surface. For example, a mechanism that circulates cooling water or warm water inside the rotary drum 3 is used as the cooling mechanism or the heating mechanism. The outer circumferential surface of the rotary drum 3 is subjected to a surface treatment that facilitates peeling of the stuck rubber sheet S, or made of a material that facilitates peeling of the stuck rubber sheet S.

The covering device 4 supports a bead core 8 such that the outer circumferential surface of the rotary drum 3 and the outer surface of the bead core 8 are brought close to each other at a position on a downstream side of the extruder 2 in the rotation direction R1 of the rotary drum 3, and the covering device 4 rotates the supported bead core 8. In the present embodiment, the position where the leading end of the mouthpiece 21 of the extruder 2 and the outer circumferential surface of the rotary drum 3 are the closest to each other and the position where the inner circumferential surface of the bead core 8 and the outer circumferential surface of the rotary drum 3 are the closest to each other are shifted by 180° in the rotation direction R1 of the rotary drum 3. In the present embodiment, an outer diameter of the rotary drum 3 is smaller than an inner diameter of the bead core 8, and the rotary drum 3 is disposed on the inner circumferential side of the bead core 8 supported by the covering device 4.

The covering device 4 winds the rubber sheet S stuck on the outer surface of the bead core 8 along a sectional shape of the bead core 8. The covering device 4 can rotate the supported bead core 8 in an R2 direction. The bead core 8 is rotated according to the rotation of the rotary drum 3.

Figure 3:
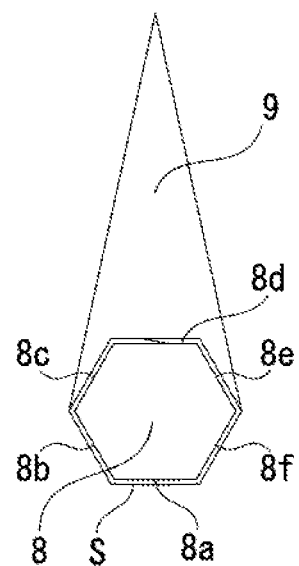
FIG. 3 is a sectional view of a bead core.

FIG. 3 is a sectional view of the bead core 8. The bead core 8 of the present embodiment has a hexagonal shape in section. It is assumed that the inner circumferential surface of the bead core 8 is a lower surface 8a, that the outer circumferential surface is an upper surface 8d, that a side surface on the inner circumferential side is lower side surfaces 8b, 8f, and that a side surface on the outer circumferential side is upper side surfaces 8c, 8e. The rubber sheet S is wound on the surface of the bead core 8. A bead filler 9 having a substantially triangular shape in section is disposed on the outer circumferential side of the bead core 8. For example, the inner diameter of the bead core 8 of the present embodiment ranges from 400 mm to 650 mm.

The covering device 4 includes a pressing roller 41, a first forming roller 42, a lower side surface crimping roller 43, a second forming roller 44, a first upper side surface crimping roller 45, a first bending roller 46, a second upper side surface crimping roller 47, a second bending roller 48, and a finishing roller 49 in this order from the upstream side to the downstream side in the rotation direction R2 of the bead core 8. A plurality of guide rollers 40 that prevent meandering of the rotating bead core 8 are provided in the covering device 4.

Figure 4A:
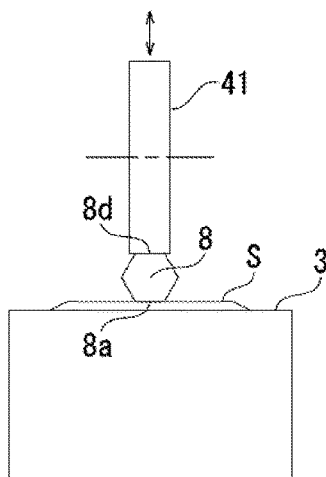
FIG. 4A is a sectional view taken along a line A-A in FIG. 1.

FIG. 4A is a sectional view taken along a line A-A in FIG. 1. The rubber sheet S is wound around the outer circumferential surface of the rotary drum 3. In the section of the rubber sheet S of the present embodiment, both ends in a width direction are thinned, and the thinned portions are overlapped to prevent a joint from being thickened when the rubber sheet S is wound around the surface of the bead core 8 to join both ends in the width direction.

The pressing roller 41 is disposed at a position opposed to the rotary drum 3 with a part of the bead core 8 interposed therebetween. The rotation axis of the pressing roller 41 is parallel to the rotation axes of the rotary drum 3 and the bead core 8, and the pressing roller 41 rotates while the outer circumferential surface of the pressing roller 41 contacts with the upper surface 8d of the bead core 8. The pressing roller 41 is configured to be movable inside and outside in a radial direction of the bead core 8. Consequently, the pressing roller 41 can press the upper surface 8d of the bead core 8 when a part in the width direction of the rubber sheet S on the outer circumferential surface of the rotary drum 3 is stuck to the lower surface 8a of the rotating bead core 8. The pressing roller 41 is a driven roller rotated by the rotation of the bead core 8.

Figure 4B:
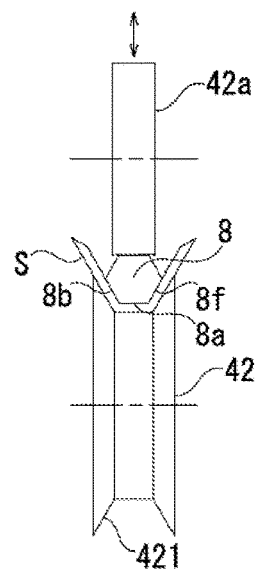
FIG. 4B is a sectional view taken along a line B-B in FIG. 1.

FIG. 4B is a sectional view taken along a line B-B of FIG. 1. The first forming roller 42 is disposed on the inner circumferential side of the bead core 8. The rotation axis of the first forming roller 42 is parallel to the rotation axis of the bead core 8. As illustrated in FIG. 4B, the first forming roller 42 has a bobbin shape in which a center is recessed with respect to the right and left. A recess 421 of the first forming roller 42 is disposed so as to contact with the lower surface 8a and the right and left lower side surfaces 8b, 8f of the bead core 8 with the rubber sheet S interposed therebetween. An auxiliary roller 42a configured to be movable inside and outside in the radial direction of the bead core 8 is disposed at the position that is opposed to the first forming roller 42 with the bead core 8 interposed therebetween. The rotation axis of the auxiliary roller 42a is parallel to the rotation axes of the first forming roller 42 and the bead core 8. Consequently, the rubber sheet S can be folded upward along the right and left lower side surfaces 8b, 8f of the bead core 8 by the recess 421 of the first forming roller 42. The first forming roller 42 and the auxiliary roller 42a are driven rollers rotated by the rotation of the bead core 8.

Figure 4C:
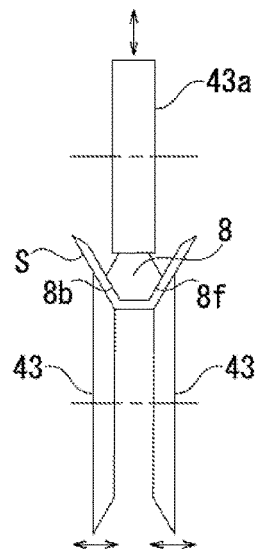
FIG. 4C is a sectional view taken along a line C-C in FIG. 1.

FIG. 4C is a sectional view taken along a line C-C in FIG. 1. The lower side surface crimping roller 43 is disposed on the inner circumferential side of the bead core 8. The rotation axis of the lower side surface crimping roller 43 is parallel to the rotation axis of the bead core 8. The lower side surface crimping rollers 43 are provided on the right and left of the bead core 8 while opposed to each other. The pair of lower side surface crimping rollers 43 is configured to be movable to the right and left in the width direction of the bead core 8. The lower side surface crimping roller 43 has a truncated cone shape, and the outer circumferential surfaces formed into a tapered surface are disposed so as to contact with the lower side surfaces 8b, 8f of the bead core 8 with the rubber sheet S interposed therebetween. An auxiliary roller 43a configured to be movable inside and outside in the radial direction of the bead core 8 is disposed at the position opposed to the lower side surface crimping roller 43 with the bead core 8 interposed therebetween. The rotation axis of the auxiliary roller 43a is parallel to the rotation axes of the lower side surface crimping roller 43 and the bead core 8. Consequently, the rubber sheet S can be crimped to the lower side surfaces 8b, 8f of the bead core 8 by the lower side surface crimping roller 43. The lower side surface crimping roller 43 is a driving roller driven by a motor (not illustrated), and the auxiliary roller 43a is a driven roller rotated by the rotation of the bead core 8.

Figure 4D:
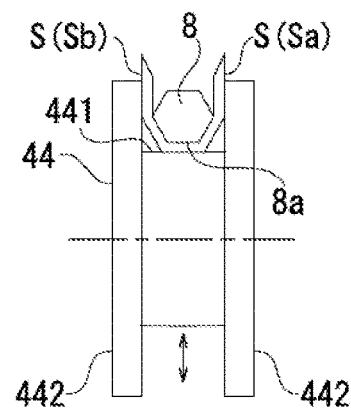
FIG. 4D is a sectional view taken along a line D-D in FIG. 1.

FIG. 4D is a sectional view taken along a line D-D in FIG. 1. The second forming roller 44 is disposed on the inner circumferential side of the bead core 8. The rotation axis of the second forming roller 44 is parallel to the rotation axis of the bead core 8. The second forming roller 44 includes a body unit 441 that rotates along the lower surface 8a of the bead core 8 and disc-shaped flanges 442 that are provided at both ends of the body unit 441. A distance between the right and left flanges 442 is substantially equal to a width obtained by adding the thickness of the rubber sheet S to the width of the bead core 8. The second forming roller 44 is configured to be movable inside and outside in the radial direction of the bead core 8. Consequently, both ends in the width direction of the rubber sheet S can be raised upward by the flange 442 of the second forming roller 44. The second forming roller 44 is a driven roller rotated by the rotation of the bead core 8.

Figure 4E:
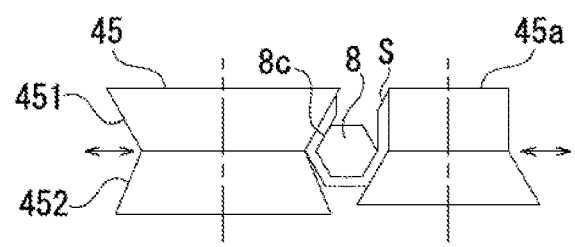
FIG. 4E is a sectional view taken along a line E-E in FIG. 1.

FIG. 4E is a sectional view taken along a line E-E in FIG. 1. The first upper side surface crimping roller 45 is disposed on the side of the bead core 8. The rotation axis of the first upper side surface crimping roller 45 is parallel to the radial direction of the bead core 8. The first upper side surface crimping roller 45 has a bobbin shape in which two truncated cone units 451, 452 are coupled together. The outer circumferential surface of one truncated cone unit 451 is disposed so as to contact with the upper side surface 8c of the bead core 8 with the rubber sheet S interposed therebetween. The first upper side surface crimping roller 45 is configured to be movable to the right and left in the width direction of the bead core 8. An auxiliary roller 45a configured to be movable in the right and left in the width direction of the bead core 8 is disposed at the position opposed to the first upper side surface crimping roller 45 with the bead core 8 interposed therebetween. The rotation axis of the auxiliary roller 45a is parallel to the rotation axis of the first upper side surface crimping roller 45. Consequently, the rubber sheet S can be crimped to the upper side surface 8c of the bead core 8 by the truncated cone unit 451 of the first upper side surface crimping roller 45. The first upper side surface crimping roller 45 is a driving roller driven by a motor (not illustrated), and the auxiliary roller 45a is a driven roller rotated by the rotation of the bead core 8.

Figure 4F:
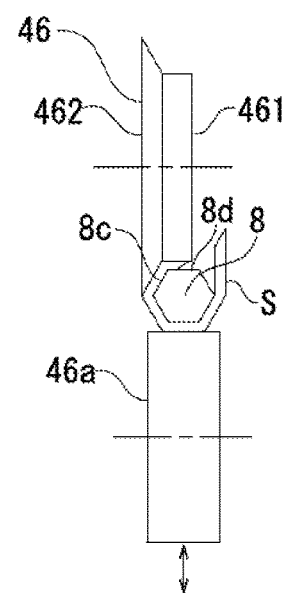
FIG. 4F is a sectional view taken along a line F-F in FIG. 1.

FIG. 4F is a sectional view taken along a line F-F in FIG. 1. The first bending roller 46 is disposed on the outer circumferential side of the bead core 8. The rotation axis of the first bending roller 46 is parallel to the rotation axis of the bead core 8. The first bending roller 46 includes a columnar unit 461 that rotates along the upper surface 8d of the bead core 8 and a truncated cone unit 462 that is provided at one end of the columnar unit 461. The outer circumferential surface of the truncated cone unit 462 is disposed so as to contact with the upper side surface 8c of the bead core 8 with the rubber sheet S interposed therebetween. An auxiliary roller 46a configured to be movable inside and outside in the radial direction of the bead core 8 is disposed at the position opposed to the columnar unit 461 of the first bending roller 46 with the bead core 8 interposed therebetween. The rotation axis of the auxiliary roller 46a is parallel to the rotation axes of the first bending roller 46 and the bead core 8. Consequently, one end of the rubber sheet S can be bent along the upper surface 8d of the bead core 8 by the columnar unit 461 of the first bending roller 46. The first bending roller 46 is a driving roller driven by a motor (not illustrated), and the auxiliary roller 46a is a driven roller rotated by the rotation of the bead core 8.

Figure 4G:
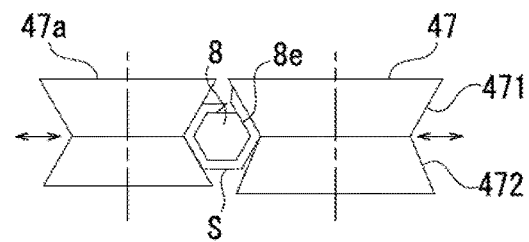
FIG. 4G is a sectional view taken along a line G-G in FIG. 1.

FIG. 4G is a sectional view taken along a line G-G in FIG. 1. The second upper side surface crimping roller 47 is disposed on the side of the bead core 8. The rotation axis of the second upper side surface crimping roller 47 is parallel to the radial direction of the bead core 8. The second upper side surface crimping roller 47 has a bobbin shape in which two truncated cone units 471, 472 are coupled together. The outer circumferential surface of one truncated cone unit 471 is disposed so as to contact with the upper side surface 8e of the bead core 8 with the rubber sheet S interposed therebetween. The second upper side surface crimping roller 47 is configured to be movable to the right and left in the width direction of the bead core 8. An auxiliary roller 47a configured to be movable in the right and left in the width direction of the bead core 8 is disposed at the position opposed to the second upper side surface crimping roller 47 with the bead core 8 interposed therebetween. The rotation axis of the auxiliary roller 47a is parallel to the rotation axis of the second upper side surface crimping roller 47. Consequently, the rubber sheet S can be crimped to the upper side surface 8e of the bead core 8 by the truncated cone unit 471 of the second upper side surface crimping roller 47. The second upper side surface crimping roller 47 is a driving roller driven by a motor (not illustrated), and the auxiliary roller 47a is a driven roller rotated by the rotation of the bead core 8.

Figure 4H:
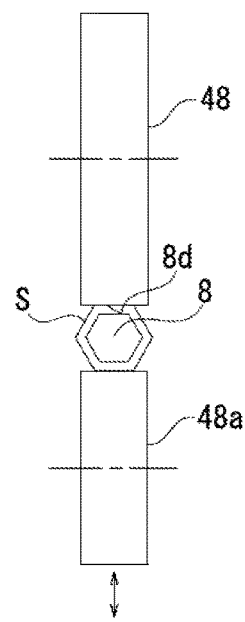
FIG. 4H is a sectional view taken along a line H-H in FIG. 1.

FIG. 4H is a sectional view taken along a line H-H in FIG. 1. The second bending roller 48 is disposed on the outer circumferential side of the bead core 8. The rotation axis of the second bending roller 48 is parallel to the rotation axis of the bead core 8. The second bending roller 48 rotates along the upper surface 8d of the bead core 8. An auxiliary roller 48a configured to be movable inside and outside in the radial direction of the bead core 8 is disposed at the position opposed to the second bending roller 48 with the bead core 8 interposed therebetween. The rotation axis of the auxiliary roller 48a is parallel to the rotation axes of the second bending roller 48 and the bead core 8. Consequently, the other end of the rubber sheet S can be bent along the upper surface 8d of the bead core 8 by the second bending roller 48. The second bending roller 48 is a driving roller driven by a motor (not illustrated), and the auxiliary roller 48a is a driven roller rotated by the rotation of the bead core 8.

Figure 4I:
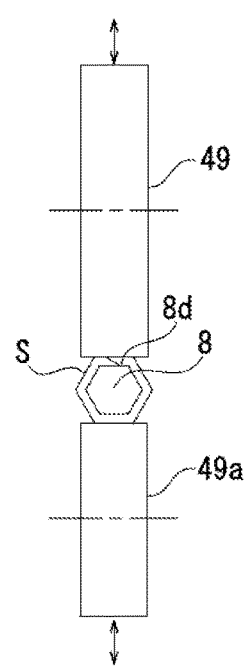
FIG. 4I is a sectional view taken along a line I-I in FIG. 1.

FIG. 4I is a sectional view taken along a line I-I in FIG. 1. The finishing roller 49 is disposed on the outer circumferential side of the bead core 8. The rotation axis of the finishing roller 49 is parallel to the rotation axis of the bead core 8. The finishing roller 49 rotates along the upper surface 8d of the bead core 8. The finishing roller 49 is configured to be movable inside and outside in the radial direction of the bead core 8. An auxiliary roller 49a configured to be movable inside and outside in the radial direction of the bead core 8 is disposed at the position opposed to the finishing roller 49 with the bead core 8 interposed therebetween. The rotation axis of the auxiliary roller 49a is parallel to the rotation axes of the finishing roller 49 and the bead core 8. Consequently, both ends of the rubber sheet S can be crimped to the upper surface 8d of the bead core 8 by the finishing roller 49. The finishing roller 49 is a driving roller driven by a motor (not illustrated), and the auxiliary roller 49a is a driven roller rotated by the rotation of the bead core 8. The finishing roller 49 and the auxiliary roller 49a may include a temperature control mechanism that warms the roller in order to increase crimping force. A temperature control mechanism in which hot water, a heater, or a gas is used is exemplified.

The air injection mechanism 5 can blow air to surroundings of the bead core 8 rotated by the covering device 4. The air injection mechanism 5 of the present embodiment is disposed between the first bending roller 46 and the second upper side surface crimping roller 47.

Figure 4J:
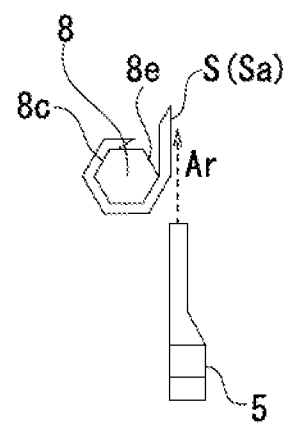
FIG. 4J is a sectional view taken along a line J-J in FIG. 1.

FIG. 4J is a sectional view taken along a line J-J in FIG. 1. The air injection mechanism 5 blows air along the surface of the rubber sheet S to a sheet portion Sa before the rubber sheet S is crimped to the upper side surface 8e of the bead core 8 by the second upper side surface crimping roller 47 in FIG. 4G. Consequently, the sheet portion Sa of the rubber sheet S can be held during the winding to prevent a warp. A direction Ar in which the air is blown is a direction (corresponding to the first direction of the present invention) directed toward the end of the rubber sheet S along the surface of the rubber sheet S, and in the present embodiment, the direction Ar is a direction from the inner circumferential side to the outer circumferential side of the bead core 8 (a direction toward the outside in the radial direction).

Both ends in the width direction of the rubber sheet S are bent upward by the second forming roller 44 in FIG. 4D. Then, a sheet portion Sb (the sheet portion on the left side in FIG. 4D) including one end is wound around the outer surface of the bead core 8 by the first upper side surface crimping roller 45 and the first bending roller 46 in a later step. However, the sheet portion Sa (the sheet portion on the right side in FIG. 4D) including the other end is in a substantially free state until the sheet portion Sa is stuck to the outer surface of the bead core 8 by the second upper side surface crimping roller 47 in a later step. For this reason, the sheet portion Sa that is wound later is easily warped, and the air is effectively blown to the sheet portion Sa.

The air injection mechanism 5 includes a plurality of injection ports along the circumferential direction of the bead core 8. In the present embodiment, for example, the injection port has a square shape having a side length of 0.9 mm, and 13 injection ports are arranged such that an injection width is 48 mm. An injection pressure of the air ranges from 0.1 MPa to 0.4 MPa. When the thickness of the rubber sheet S ranges from 1 mm to 2 mm, the injection pressure of the air is preferably greater than or equal to 0.2 MPa, more preferably ranges from 0.3 MPa to 0.4 MPa. When the injection pressure of the air is less than 0.2 MPa, the rubber sheet S cannot be sufficiently held, but the warp is generated.

The air is preferably blown by the air injection mechanism 5 at a temperature higher than an ambient temperature of the rubber sheet S. For example, the temperature of the air ranges from 60° C. to 100° C. By blowing the high-temperature air, the temperature and the tack of the rubber sheet S can be prevented from being lowered.

A bead core coating method using the bead core coating apparatus 1 will be described below. The bead core coating method of the present invention includes a step of winding the rubber sheet S extruded through the mouthpiece 21 by the extruder 2 on the outer circumferential surface of the rotary drum 3 from the leading end of the rubber sheet S; a step of sticking, from the leading end, a part in a width direction of the rubber sheet S existing on the outer circumferential surface of the rotary drum 3 to the outer surface of the bead core 8 which is in rotation, before the rubber sheet S is wound around the entire outer circumferential surface of the rotary drum 3; and a step of winding a remaining part in the width direction of the rubber sheet S stuck on the outer surface of the bead core 8 while sequentially sticking the remaining part in the width direction along the outer surface of the bead core 8 from the part in the width direction toward an end in the width direction. In the step of winding the rubber sheet S around the outer surface of the bead core 8, the air is blown to a sheet portion including the end that is not stuck to the outer surface of the bead core 8 in the currently-winding rubber sheet S in the first direction toward the end along the sheet surface or the second direction inclined toward the outer surface side of the bead core 8 as compared with the first direction.

First, the bead core 8 is set on the covering device 4. At this point, the extruder 2 is disposed outside the covering device 4.

Subsequently, the extruder 2 is advanced toward the rotary drum 3, and the mouthpiece 21 is brought close to the outer circumferential surface of the rotary drum 3.

Subsequently, the extrusion of the rubber sheet S from the mouthpiece 21 of the extruder 2 is started, and the rotation of the rotary drum 3 is started at the same time. Consequently, the extruded rubber sheet S can be wound around the outer circumferential surface of the rotary drum 3 from the leading end of the rubber sheet S.

Subsequently, the central portion in the width direction of the rubber sheet S wound around the outer circumferential surface of the rotary drum 3 is stuck to the lower surface 8a of the bead core 8 which is in rotation, from the leading end of the rubber sheet S (see FIG. 4A).

Subsequently, in the rubber sheet S stuck to the lower surface 8a of the bead core 8, both ends in the width direction of the rubber sheet S are wound along the outer surface of the bead core 8 by the covering device 4 (see FIGS. 4B to 4I). In the step of winding the rubber sheet S around the outer surface of the bead core 8, the air is blown to the sheet portion (in the present embodiment, the sheet portion Sa) including the end that is not stuck to the outer surface of the bead core 8 in the currently-winding rubber sheet S by the air injection mechanism 5 in the direction toward the end along the sheet surface (corresponding to the first direction of the present invention). Finally, the extruder 2 is retracted, and the bead core 8 coated with the rubber sheet S is removed from the covering device 4.

In the bead core coating method of the present invention, preferably the step of winding the rubber sheet S extruded from the extruder 2 through the mouthpiece 21 to the outer circumferential surface of the rotary drum 3 from the leading end includes: a preparation step of bringing the mouthpiece 21 close to the rotary drum 3; a winding start step of starting extrusion of the rubber from the mouthpiece 21, which is close to the rotary drum, and at the same time starting the rotation of the rotary drum 3, and molding a winding start portion having a wedge shape in section by gradually increasing the extruded amount of rubber up to a predetermined amount and by gradually increasing the distance between the rotary drum 3 and the mouthpiece 21 up to a predetermined distance corresponding to the desired thickness of the rubber sheet S; a winding step of winding the rubber sheet S by maintaining the extruded amount of rubber at the predetermined amount and maintaining the distance between the rotary drum 3 and the mouthpiece 21 at the predetermined distance; a winding end step of molding a winding end portion having a wedge shape in section by gradually decreasing the distance between the rotary drum 3 and the mouthpiece 21 from the predetermined distance while gradually decreasing the extruded amount of rubber from the predetermined amount.

In the case that the rubber extruded by the extruder 2 is wound around the rotary drum 3, when the extruded rubber passes through a gap between the mouthpiece 21 and the outer circumferential surface of the rotary drum 3 so as to rub against the gap, the rubber passing through the gap has a thickness of the gap.

That is, in the winding start step, the extruded amount of rubber is gradually increased up to a predetermined amount, and a distance between the rotary drum 3 and the mouthpiece 21 is gradually increased up to a predetermined distance, whereby a winding start portion having a wedge shape in section in which the thickness is gradually increased up to the desired thickness of the rubber sheet S can be molded while the width is kept constant. In the winding step, the extruded amount of rubber is maintained at a predetermined amount, and the distance between the mouthpiece 21 and the rotary drum 3 is maintained at a predetermined distance, so that the wound rubber can have a desired thickness while the width is kept constant. In the winding end step, the extruded amount of rubber is gradually decreased from the predetermined amount, and the distance between the rotary drum 3 and the mouthpiece 21 is gradually decreased from the predetermined distance, whereby a winding end portion having a wedge shape in section in which the thickness is gradually decreased can be molded while the width is kept constant. The rubber sheet S is stuck to the outer surface of the bead core 8 such that the winding end portion overlaps the winding start portion, which allows elimination of a level difference at the joint between the winding start and the winding end. The level difference at the joint is eliminated by using the method for molding the rubber sheet S in the tire manufacturing, so that air inclusion is not generated during vulcanization to improve uniformity. In the winding step, the distance between the mouthpiece 21 and the rotary drum 3 may be larger than the desired thickness of the rubber sheet S. When the shape of the discharge port of the mouthpiece 21 is identical to the desired sectional shape of the rubber sheet S, the rubber sheet S having the desired thickness can be molded by maintaining the extruded amount of rubber at a predetermined amount in the winding step.

Other Embodiments (1) In the above embodiment, the air injection mechanism 5 is disposed between the first bending roller 46 and the second upper side surface crimping roller 47. However, the present invention is not limited to this configuration, but the air injection mechanism 5 may be disposed at another place. For example, the air injection mechanism 5 may be disposed between the second forming roller 44 and the first upper side surface crimping roller 45 or between the second upper side surface crimping roller 47 and the second bending roller 48.

(2) In the above embodiment, by way of example, the central portion in the width direction of the rubber sheet S wound around the outer circumferential surface of the rotary drum 3 is stuck to the inner circumferential surface (lower surface 8a) of the rotating bead core 8 from the leading end of the rubber sheet S. However, the present invention is not limited to this configuration.

Figure 5:
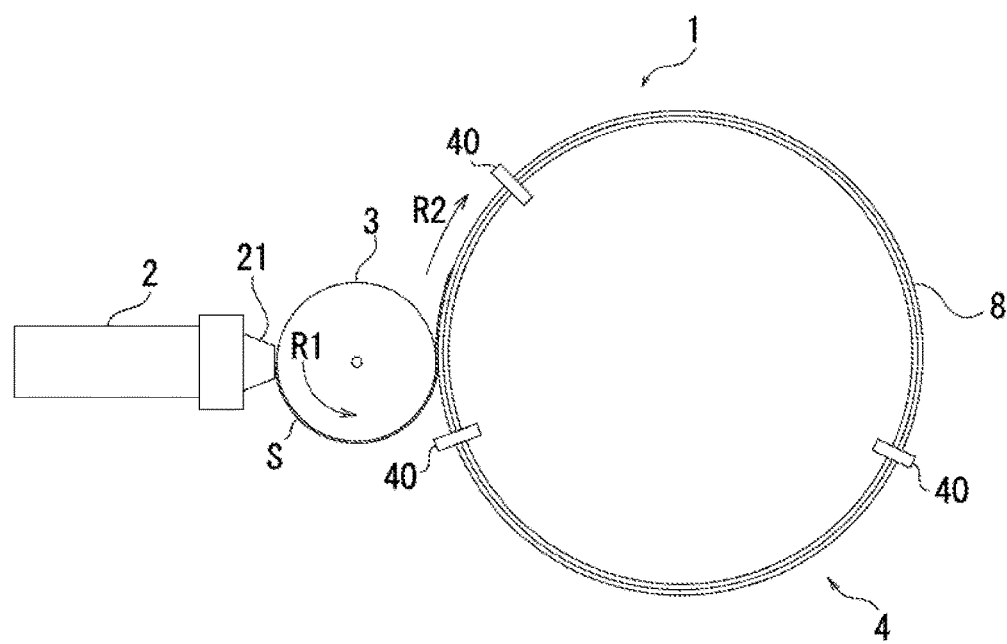
FIG. 5 is a schematic diagram illustrating another example of the configuration of the bead core coating apparatus.

For example, as illustrated in FIG. 5, the rotary drum 3 is disposed on the outer circumferential side of the bead core 8, and the central portion in the width direction of the rubber sheet S wound around the outer circumferential surface of the rotary drum 3 may be stuck to the outer circumferential surface of the rotating bead core 8 from the leading end of the rubber sheet S. According to this configuration, a facility layout is simplified, and a size of the bead core can easily be changed.

Alternatively, the rotary drum 3 is disposed on the side of the bead core 8, and the central portion in the width direction of the rubber sheet S wound around the outer circumferential surface of the rotary drum 3 may be stuck to the side surface of the rotating bead core 8 from the leading end of the rubber sheet S. According to this configuration, similarly to the configuration in FIG. 5, the facility layout is simplified, and the size of the bead core can easily be changed.

(3) In the above embodiment, by way of example, the position where the leading end of the mouthpiece 21 of the extruder 2 and the outer circumferential surface of the rotary drum 3 are the closest to each other and the position where the inner circumferential surface of the bead core 8 and the outer circumferential surface of the rotary drum 3 are the closest to each other are shifted by 180° in the rotation direction R1 of the rotary drum 3. However, the present invention is not limited to this configuration, but the positions are shifted by 90° or 270° in the rotation direction R1.

Figure 6:
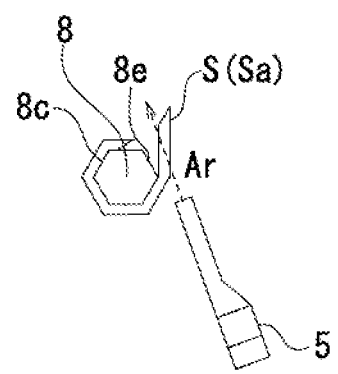
FIG. 6 is a schematic diagram illustrating still another example of the configuration of the bead core coating apparatus.

(4) In the above embodiment, the direction Ar in which the air is blown to the sheet portion Sa including the end that is not stuck to the outer surface of the bead core 8 in the currently-winding rubber sheet S is set to the first direction toward the end of the rubber sheet S along the sheet surface. However, the present invention is not limited to this configuration. The direction Ar in which the air is blown may be set to the second direction that is inclined toward the outer surface side of the bead core 8 as compared with the first direction as illustrated in FIG. 6. The sheet portion Sa is brought closer to the outer surface side of the bead core 8 by the air blowing, so that the sheet portion Sa can easily be wound around the outer surface of the bead core 8 in a subsequent step.

What is claimed is:

1. A bead core coating method for coating an annular bead core with a belt-shaped rubber sheet, the bead core coating method comprising the steps of:
    winding the rubber sheet extruded through a mouthpiece by an extruder on an outer circumferential surface of a rotary drum from a leading end of the rubber sheet;
    sticking, from the leading end, a part in a width direction of the rubber sheet existing on the outer circumferential surface of the rotary drum to an outer surface of the bead core which is in rotation, before the rubber sheet is wound around an entire circumference of the outer circumferential surface of the rotary drum; and
    winding a remaining part in the width direction of the rubber sheet stuck on the outer surface of the bead core while sequentially sticking the remaining part in the width direction along the outer surface of the bead core from the part in the width direction toward an end in the width direction,
    wherein in the step of winding the rubber sheet around the outer surface of the bead core, air is blown to a sheet portion including the end that is not stuck to the outer surface of the bead core in the currently-winding rubber sheet in a first direction toward the end along a sheet surface or a second direction inclined toward an outer surface side of the bead core as compared with the first direction,
    the rotary drum is disposed on an inner circumferential side of the bead core, and a central portion in the width direction of the rubber sheet is stuck to an inner circumferential surface of the bead core which is in rotation, and
    in the step of winding the rubber sheet around the outer surface of the bead core, after a sheet portion including one end in the width direction of the rubber sheet is wound, a sheet portion including the other end is wound,
    air is blown to the sheet portion including the other end,
    wherein in the step of winding the rubber sheet around the outer surface of the bead core, the one end of the sheet portion in the width direction of the rubber sheet is wound and bent along an upper surface of the bead core in a direction of an outer circumferential surface of the bead core,
    the one end of the sheet portion in the width direction of the rubber sheet is crimped to the upper side surface of the bead core,
    the other end of the sheet portion is wound bent along an upper surface of the bead core in an opposite direction in a width direction to the one end of the sheet portion, and
    the other end of the sheet portion in the width direction of the rubber sheet is crimped to the upper side surface of the bead core, and wherein the air is blown to the other end before it is crimped to the upper side surface of the bead core.

2. The bead core coating method according to claim 1, wherein air having a temperature higher than an ambient temperature of the rubber sheet is blown to the sheet portion including the end.

3. The bead core coating method according to claim 1, wherein the rubber sheet extruded through the mouthpiece by the extruder on the outer circumferential surface of the rotary drum is thinned at both ends in a width direction.

4. The bead core coating method according to claim 3, wherein both thinned ends are overlapped when the rubber sheet is wound around the surface of the bed core.

5. The bead core coating method according to claim 1, wherein the other end of the sheet portion overlaps with the one end of the sheet portion.

6. The bead core coating method according to claim 1, wherein the direction of the air is from an inner circumferential side to the outer circumferential side of the bead core.

7. A bead core coating method for coating an annular bead core with a belt-shaped rubber sheet, the bead core coating method comprising the steps of:
- winding the rubber sheet extruded through a mouthpiece by an extruder on an outer circumferential surface of a rotary drum from a leading end of the rubber sheet;
- sticking, from the leading end, a part in a width direction of the rubber sheet existing on the outer circumferential surface of the rotary drum to an outer surface of the bead core which is in rotation, before the rubber sheet is wound around an entire circumference of the outer circumferential surface of the rotary drum; and
- winding a remaining part in the width direction of the rubber sheet stuck on the outer surface of the bead core while sequentially sticking the remaining part in the width direction along the outer surface of the bead core from the part in the width direction toward an end in the width direction,
- wherein in the step of winding the rubber sheet around the outer surface of the bead core, air is blown to a sheet portion including the end that is not stuck to the outer surface of the bead core in the currently-winding rubber sheet in a first direction toward the end along a sheet surface or a second direction inclined toward an outer surface side of the bead core as compared with the first direction,
- the rotary drum is disposed on an inner circumferential side of the bead core, and a central portion in the width direction of the rubber sheet is stuck to an inner circumferential surface of the bead core which is in rotation, and
- in the step of winding the rubber sheet around the outer surface of the bead core, after a sheet portion including one end in the width direction of the rubber sheet is wound, a sheet portion including the other end is wound,
- air is blown to the sheet portion including the other end,
- wherein the bead core is set on a covering device, and
- the covering device comprises a pressing roller, a first forming roller, a lower side surface crimping roller, a second forming roller, a first upper side surface crimping roller, a first bending roller, a second upper side surface crimping roller, a second bending roller, and a finishing roller in stated order from an upstream side to a downstream side in a rotation direction of the bead core.

* * * * *